United States Patent
Arumilli et al.

(10) Patent No.: US 11,514,521 B1
(45) Date of Patent: Nov. 29, 2022

(54) METHOD AND SYSTEM FOR IMPLEMENTING A CONSOLIDATED LIMITS REPOSITORY

(71) Applicant: JPMorgan Chase Bank, N.A., New York, NY (US)

(72) Inventors: Suresh Arumilli, Katy, TX (US); Ulku Rowe, New York, NY (US); Raymond Stephens, New York, NY (US); David J. Garvett, Pelham, NY (US); Ranjith Ananthanarayanan, Houston, TX (US); Thien B. Le, League City, TX (US); Barney O'Kane, Darien, CT (US); Justin M. Cohen, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 258 days.

(21) Appl. No.: 15/593,797

(22) Filed: May 12, 2017

(51) Int. Cl.
*G06Q 40/04* (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| | | | | |
|---|---|---|---|---|
| 7,340,433 B1 * | 3/2008 | Kay | .......... | G06Q 40/00 705/35 |
| 7,395,232 B1 * | 7/2008 | Pilato | .......... | G06Q 40/02 705/35 |
| 7,610,233 B1 * | 10/2009 | Leong | .......... | G06Q 10/087 705/26.3 |
| 7,630,986 B1 * | 12/2009 | Herz | .......... | G06Q 10/10 |
| 7,752,116 B2 * | 7/2010 | Ascher | .......... | G06Q 40/00 705/37 |
| 8,433,645 B1 * | 4/2013 | Waelbroeck | .......... | G06Q 40/04 705/37 |

(Continued)

OTHER PUBLICATIONS

Risk Management Controls for Brokers and Dealers with Market Access, Exchange Act Release No. 63241 (Nov. 3, 2010), 75 Fed. Reg. 69792 (Nov. 15, 2010). (Year: 2010).*

(Continued)

*Primary Examiner* — Daniel S Felten
*Assistant Examiner* — Claire A Rutiser
(74) *Attorney, Agent, or Firm* — Greenblum & Bernstein, P.L.C.

(57) ABSTRACT

According to an embodiment of the present invention, an automated computer implemented system maintains and manages limits data relating to restrictions associated with a client, trader, machine or other entity. The system comprises a consolidated repository; an interactive user interface; a trading system interface that communicates approved limit to one or more trading or limit enforcement systems; and a computer processor. The computer processor is programmed to: receive inputs from a plurality of sources; identify one or more authorized users to request and approve the limits; effectuate the one or more limits for the trade request via one or more trading or limit enforcement systems; and provide, via the interactive user interface, a reporting function for data relating to one or more limits.

14 Claims, 6 Drawing Sheets

(56) References Cited

U.S. PATENT DOCUMENTS

| | | | | |
|---|---|---|---|---|
| 8,566,213 B2* | 10/2013 | Sweeting | G06Q 40/04 | 705/37 |
| 8,566,216 B1* | 10/2013 | Topitzer | G06Q 40/04 | 705/35 |
| 8,566,219 B2* | 10/2013 | Mintz | G06Q 40/06 | 705/35 |
| 9,063,985 B2* | 6/2015 | Lawrence | G06F 16/24578 | |
| 9,501,795 B1* | 11/2016 | Friedman | G06Q 40/06 | |
| 9,607,338 B2* | 3/2017 | Salvadori | G06Q 30/0283 | |
| 10,061,915 B1* | 8/2018 | Roth | H04L 67/10 | |
| 10,152,747 B2* | 12/2018 | Lawrence | G06Q 30/08 | |
| 10,181,157 B2* | 1/2019 | Kontos | G06Q 40/04 | |
| 10,453,133 B1* | 10/2019 | Solinger | G06Q 40/04 | |
| 2001/0056398 A1* | 12/2001 | Scheirer | G06Q 40/02 | 705/38 |
| 2002/0082967 A1* | 6/2002 | Kaminsky | G06Q 40/025 | 705/37 |
| 2002/0156719 A1* | 10/2002 | Finebaum | G06Q 40/04 | 705/37 |
| 2002/0156720 A1* | 10/2002 | Chow | G06Q 40/00 | 705/37 |
| 2003/0033240 A1* | 2/2003 | Balson | G06Q 10/10 | 705/37 |
| 2003/0167219 A1* | 9/2003 | Quraishi | G06N 5/04 | 705/36 R |
| 2007/0156568 A1* | 7/2007 | Jovanovic | G06Q 40/06 | 705/37 |
| 2007/0179881 A1* | 8/2007 | Lord | G06Q 40/04 | 705/37 |
| 2009/0112775 A1* | 4/2009 | Chiulli | G06Q 40/025 | 705/36 R |
| 2010/0332368 A1* | 12/2010 | Alderucci | G06Q 40/04 | 705/37 |
| 2011/0022509 A1* | 1/2011 | MacKey, Jr. | G06Q 40/04 | 705/37 |
| 2012/0166327 A1* | 6/2012 | Amicangioli | G06Q 40/04 | 705/37 |
| 2012/0284158 A1* | 11/2012 | Kovac | G06Q 40/06 | 705/37 |
| 2013/0110961 A1* | 5/2013 | Jadhav | G06F 15/167 | 709/213 |
| 2014/0019327 A1* | 1/2014 | Lutnick | G06F 16/24578 | |
| 2014/0052617 A1* | 2/2014 | Chawla | G06Q 20/12 | 705/39 |
| 2014/0081823 A1* | 3/2014 | Phadnis | G06Q 40/04 | 705/80 |
| 2014/0330694 A1* | 11/2014 | Barker | G06Q 40/04 | 705/37 |
| 2015/0178744 A1* | 6/2015 | Noyes | G06Q 30/0202 | 705/7.29 |
| 2016/0012532 A1* | 1/2016 | Olson | G06Q 40/04 | 705/80 |
| 2016/0027113 A1* | 1/2016 | Sodhi | G06Q 40/04 | 705/37 |
| 2016/0225085 A1* | 8/2016 | Brookfield | G06Q 40/04 | |
| 2016/0267590 A1* | 9/2016 | Liu | G06Q 40/04 | |
| 2017/0032462 A1* | 2/2017 | Perrett | G06Q 30/0201 | |
| 2017/0323234 A1* | 11/2017 | Bosanquet | G06Q 10/0635 | |
| 2017/0372423 A1* | 12/2017 | Goodman | G06Q 40/04 | |

OTHER PUBLICATIONS

Trading Technologies, "TT User Setup User Manual" Version 7.X, 2014 (Year: 2014).*

* cited by examiner

METHOD AND SYSTEM FOR IMPLEMENTING A CONSOLIDATED LIMITS REPOSITORY

FIELD OF THE INVENTION

The present invention relates generally to a consolidated repository and more specifically to a consolidated limits repository that manages limits on how much a trader, client, machine or other entity can trade or clear and provides a consolidated, consistent and accurate view of various limits for the entity.

BACKGROUND OF THE INVENTION

Electronic trading has experienced tremendous growth over the past decade. In recent years, there has been a doubling of users and significant volume increases across products. As a result, intraday exposure is significant. Trade execution times have decreased from seconds to microseconds and high-frequency trading firms have continued to proliferate.

The risk of not having appropriate controls and limits has grown exponentially. Existing controls to mitigate catastrophic risk are no longer sufficient as demonstrated by multiple trading incidents over the past several years, including numerous flash crashes and other breaches. In addition, new regulations have mandated the introduction of new limits and robust controls for maintaining these limits.

Current systems maintain limits in databases, configuration files, as well as application code, where limit changes are often made as a result of a verbal communication or an email. With current systems, if a regulator or Risk officer wanted to know who requested and approved a limit and at what time, the process required would be time-consuming and overly burdensome. Similarly, if a requester wanted a list of limits for a given trader, client, or other entity, the requester would need to search multiple systems to obtain an answer.

These and other drawbacks exist.

SUMMARY OF THE INVENTION

Accordingly, one aspect of the invention is to address one or more of the drawbacks set forth above. According to an embodiment of the present invention, an automated computer implemented system maintains and manages limits data relating to restrictions associated with a trader, client, machine, or other entity. The system comprises: a consolidated repository that stores and manages limits data that defines how much a trader, client, machine, or other entity can trade or clear; an interactive user interface that receives one or more user inputs; an interface that communicates approved limits to one or more trading or limit enforcement systems; and a computer processor. The computer processor is coupled to the consolidated repository, the interactive user interface and the trading system interface, and programmed to: receive inputs from a plurality of sources; identify one or more authorized users to request and approve the limits; effectuate the one or more limits for the trade request via one or more trading or limit enforcement systems; and provide, via the interactive user interface, a reporting function for data relating to one or more limits.

According to another embodiment of the present invention, an automated computer implemented method that maintains and manages limits data relating to restrictions associated with an entity. The method comprises the steps of: receiving inputs from a plurality of sources; maintaining the inputs in a consolidated repository that stores and manages limits data that defines how much a trader, client, machine, or other entity can trade or clear; identifying one or more authorized users to request and approve the limits; effectuating, via a trading system interface that communicates approved limits to one or more trading or limit enforcement systems, the one or more limits for the trade request via one or more trading limit enforcement systems; and providing, via an interactive user interface that receives one or more user inputs, a reporting function for data relating to one or more limits.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DESCRIPTION OF EMBODIMENTS OF THE INVENTION

Figure 1:
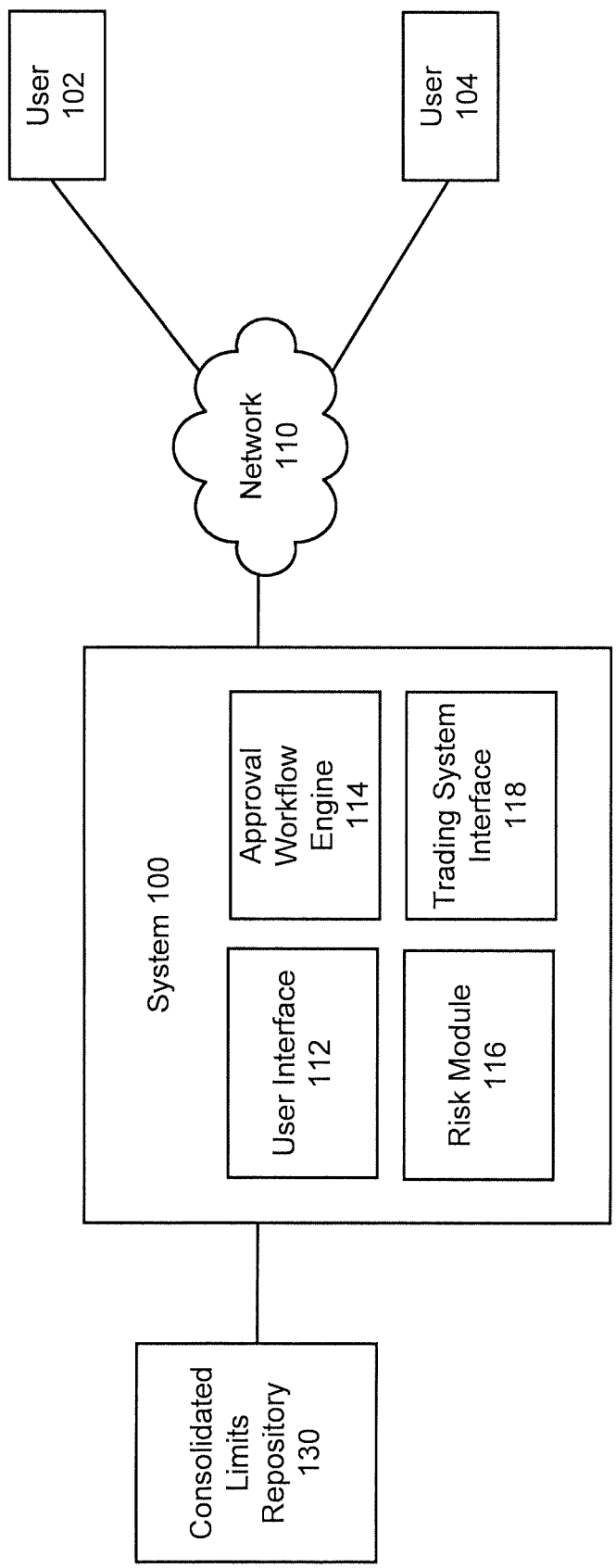
FIG. 1 is an exemplary system diagram that implements a consolidated limits repository, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to capturing and retaining limits. In accordance with the various embodiments of the present invention, limits may refer to a restriction placed on an entity. For example, limits may refer to how much a client can trade or clear. Limits may indicate how much a principal trader may trade. Also, limits may define how much a machine that executes trades based on coded algorithms may trade. Other restrictions may be defined by a limit.

A key feature of an embodiment of the present invention is a systematic approval workflow to ensure that only authorized users request and approve limits.

An embodiment of the present invention is directed to a consolidated limits repository for risk limits and key controls across an entity. The repository may function as an authoritative source for various client and house risk limits which impact a user or system's ability to trade or clear. Such limits may include trading limits, credit risk limits, market risk limits and regulatory limits.

Limits may include various risks, such as market risk limits, credit risk limits, and front office limits that may be controlled by an entity or business. Limits may be defined as a dollar amount, percentage of an amount, a variable amount, a contingent value, etc. For example, a stress limit may be a fixed dollar amount or a percentage of a net asset value (NAV) of the client. The system may capture an upper threshold of a maximum limit. Also, limits may be imposed by exchangers, regulators, as well as other government agencies, governing entities, associations, business entities, etc. An embodiment of the present invention provides a centralized consolidated limits repository that receives and/or accesses disparate sources of limit related data and provides a consistent and accurate application and management of the various limits for an entity as well as across multiple entities.

An embodiment of the present invention may ensure that authorized people are requesting and approving limits. The system may implement an entitlement framework that ensures consistent and accurate enforcement of limits.

An embodiment of the present invention provides a detailed audit trail that identifies a requesting entity, an approving entity, and details concerning the request, etc. The system helps meet regulatory and other obligations.

An embodiment of the present invention provides a consolidated limits repository that manages limits data from various sources. The repository implements a real-time distributed caching technology that provides resiliency, speed and reduces latency. For example, if a trader attempts to execute a trade near closing, the system may receive a request for a limit change and provide real-time distribution after the limit is approved to ensure that the trader is able to perform an authorized trade. This real-time approach is not available with current systems.

An embodiment of the present invention may also provide a messaging functionality and threshold determination. The system captures warning threshold and sends those values to other systems which may then calculate if an entity has hit those thresholds. A warning threshold may be defined and applied based on user (or system) defined conditions. For example, a user may be notified when a limit is approaching. According to an embodiment of the present invention, the system provides the alert thresholds to the enforcement systems. The enforcement systems in turn generate alert.

FIG. 1 is an exemplary system diagram that implements a consolidated limits repository, according to an embodiment of the present invention. System 100 illustrates an exemplary implementation of a Consolidated Limits Repository, as illustrated by 130. Various users of the system may be represented by Users 102, 104. Users 102, 104 may access the system via a Network, as represented by 110. User Interface 112 provides an interactive interface for various users to interact with Engine 114 and Repository 130. Engine 114 may provide various processing and functionality through various processing components and modules, which may include Risk Module 116 and Trading System Interface 118. These modules are exemplary and illustrative, System 100 may include additional modules, a combination of the modules described and/or less modules than illustrated. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

An embodiment of the present invention is directed to a consolidated limits repository that supports a configuration based limit capture and distributed system that is interoperable with any limit enforcement system. To accommodate the various different types of limits that exist, an embodiment of the present invention defines a structure of what a limit encompasses, at Risk Module 116, for example. Limits may include various types of risk, such as Credit Risk, Market Risk, Front Office, and Regulatory against clients, traders, algorithms, products, industries, and other entities. A limit definition may be captured in a configuration file, such as a text-based JSON-formatted configuration file, and may further contain a set of criteria that uniquely defines a limit and its attributes, including upper and lower bounds as well as other features. As part of the data model, an embodiment of the present invention also supports a concept of a "portfolio," which is a generic object that captures what entities a limit applies to (e.g., the specific client, trader, machine, product, etc.) Limits created based on this exemplary configuration file may be distributed to an approval workflow engine which has the ability to identify approvers based on the criteria/attributes associated with the limit. According to an exemplary embodiment, the approved limits are disseminated via messaging and RESTful web service mechanisms so they can be enforced in real-time or as part of a batch process.

An embodiment of the present invention may utilize an in-memory distributed caching technology to achieve performance and resiliency goals. To mitigate the risk of having a single point of failure, an embodiment of the present invention may provide a conformance pack to which consuming enforcement systems adhere. This conformance pack may include test cases to cover various failure scenarios, such as an ability to use the last known set of limits.

An embodiment of the present invention is directed to reducing the risk of errors by providing a streamlined and auditable approval workflow with additional checks which ensures that the right users are requesting and approving limits. An embodiment of the present invention provides transparency, increases efficiency, and minimizes the cost of control activities. The system of an embodiment of the present invention further empowers risk and businesses to manage its own limits and further takes the development and support teams out of this process.

In addition, a generic implementation and extensive limit object model may allow new limits to be quickly on-boarded via changes in configuration instead of code. Regulatory requirements around maker-checker processes and audit trails may be satisfied by default. Limit changes may be distributed in real-time instead of via overnight batches. As limits are centrally and consistently captured, an embodiment of the present invention may immediately identify limits in place for a given client, trader, algorithm, product, industry, or other entity. The various embodiments of the present invention may further decrease infrastructure and support costs as several existing limit systems may be decommissioned.

An embodiment of the present invention provides a comprehensive consolidated view of limits across an entity or plurality of entities (e.g., the Wholesale Bank). An embodiment of the present invention provides a flexible limit model that defines criteria that uniquely defines a limit and attributes to capture different types of controls. Real-time publishing of approved limits to trading platforms for limit enforcement may also be realized.

An embodiment of the present invention may also develop profile functionality to allow limits to be set on a class of users and/or clients instead of individuals (e.g., the ability to set a limit on a Junior Equity Trader profile instead of the individual traders), which provides consistency and efficiency. In addition, intraday exposure and/or utilization data may be integrated.

Other embodiments, uses, and advantages of the invention will be apparent to those skilled in the art from consideration of the specification and practice of the invention disclosed herein. The specification and examples should be considered exemplary only, and the scope of the invention is accordingly not intended to be limited thereby.

According to one embodiment, the system may be operated and maintained by a financial institution, service provider, third party entity and/or other entity. As shown in FIG. 1, Users 102, 104 may access a Network 110 via various devices, including mobile device, computers as well as other communication and processing devices, etc. The foregoing description is merely one example of a configuration for such functions and is not intended to be limiting.

Referring again to FIG. 1, Network 110 enables communications between various computing devices and storage devices in the system. Network 110 may comprise one or more of the Internet, a wide area network (WAN), a local area network (LAN), and/or an intranet, according to various embodiments of the invention. Network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

Figure 2:
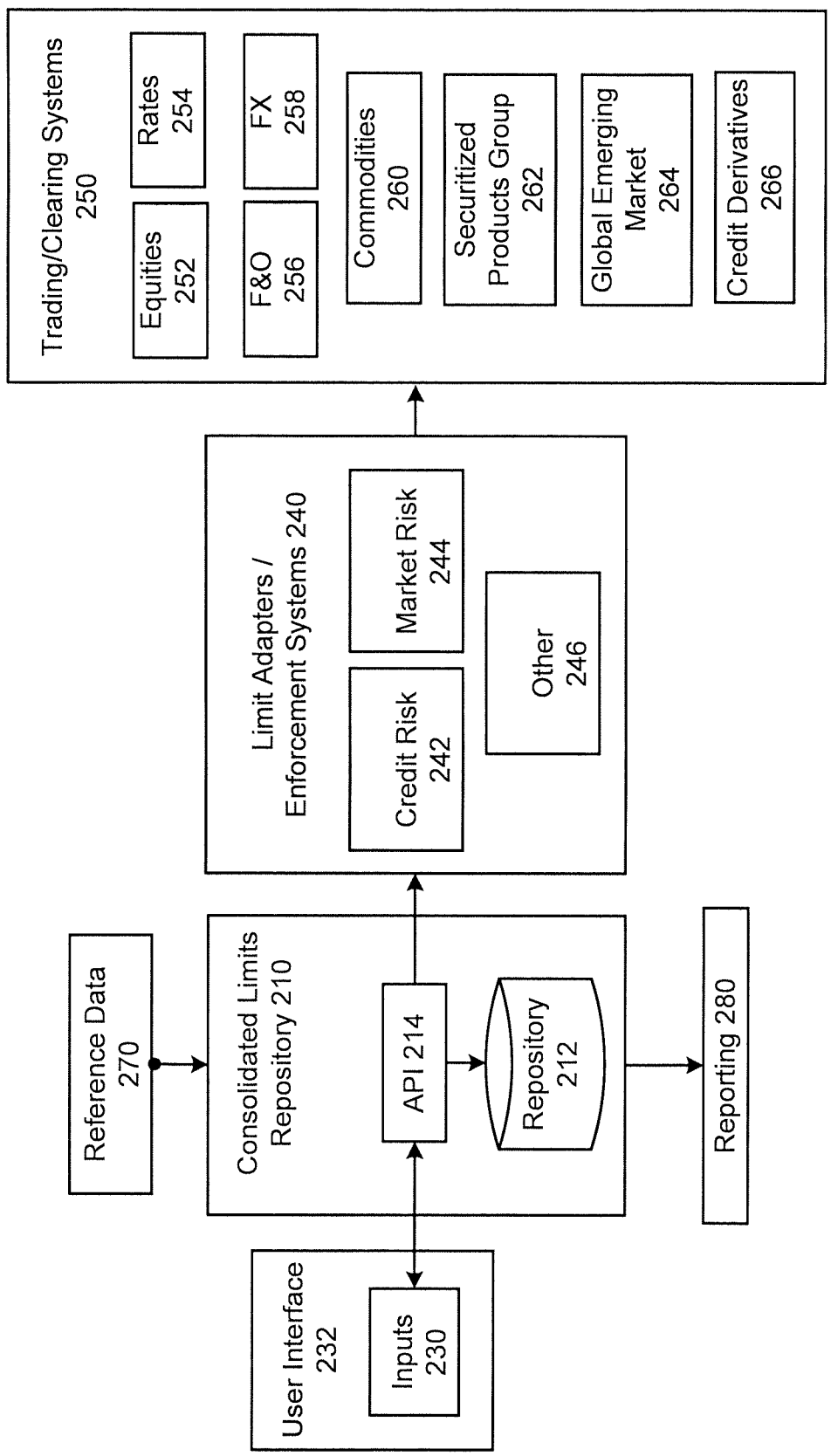
FIG. 2 is a system diagram that illustrates an exemplary platform, according to an embodiment of the present invention.

FIG. 2 is a system diagram that illustrates an exemplary platform, according to an embodiment of the present invention. An embodiment of the present invention is directed to a Consolidated Limits Repository for risk limits and key controls across a wholesale and investment bank or other entity. An embodiment of the present invention represents an authoritative source for client and house risk limits which impact a user or system's ability to trade or clear. The strategic limits management repository may reduce the risk of errors by providing a clear and auditable approval workflow which ensures that the right users are requesting and approving limits. The strategic limits management repository provides transparency, increases efficiency and reduces the cost of control activities. The strategic limits management repository also empowers risk and businesses to manage its own limits.

Consolidated Limits Repository platform may be represented by 210, which may include a Repository 212 and API 214. Consolidated Limits Repository platform 210 may include a UI represented by 232 which may include Inputs 230 to receive data from various sources. Consolidated Limits Repository platform 210 may also integrate with other systems that have their own UI who then communicate limit requests via an API. Consolidated Limits Repository platform 210 may also receive Reference Data represented by 270. Reference Data 270 may include clients, traders, exchanges, products, entitlements, etc. The reference data may be automatically refreshed so that as new clients, traders, products, etc. are added, they may be automatically pulled into the system and do not require any changes to set limits on these new entities. Consolidated Limits Repository platform 210 may communicate with Limit Adapters/Enforcement Systems 240, which may include Credit Risk 242, Market Risk 244 and/or other Risk, represented by 246. Limit Adapters/Enforcement Systems 240 may communicate with various Trading/Clearing Systems represented by 250. Trading/Clearing Systems 250 may include Equities 252, Rates 254, Futures and Options (F&O) 256, Foreign Exchange (FX) 258, Commodities 260, Securitized Products Group 262, Global Emerging Markets 264 and Credit Derivatives 266.

Trading limits may include limits configured to control orders sent to the market (e.g., single order quantity, number of orders per second). Credit Risk Limits may include limits set up internally to monitor our credit risk exposure to a counterparty. Market Risk Limits may include limits set up internally to monitor market risk (e.g., Daily P&L). Regulatory Limits may include limits imposed on either the trading or clearing business by external regulators (e.g., market excess checks). The system provides a unified and controlled approval workflow with an audit trail; views of various limits across lines of business (LOBs) for a client, trader and/or other. The system also provides a consolidation of multiple LOB limit systems, rapid onboarding of limits and further satisfies regulatory requirements.

An embodiment of the present invention provides a central platform to request, approve and report limits across multiple consuming systems. Functionalities may include an internal user interface for the setting and changing of limits and an interface to allow other systems to submit limit requests to the consolidated limits repository. The system may implement hierarchies such as client, account, and trader to more easily select the primary attributes that a limit is applied against. The system may implement an automated workflow to provide a controlled approval and notification process, event driven distribution of limits to enforcement systems, an ability to zero out limits and stop or reduce trading and further provide a flexible framework to quickly establish and support new limit types.

An embodiment of the present invention may provide various functions and features, including an approval authority service based on approval grids and rules, limit approvals via other systems; periodic review and recertification of limits; limit profiles; bulk upload of limits; proxy approvals via delegates; manual collateral postings; integration with other systems; manually implemented workflows for consuming systems that do not have an API, and customized reporting.

An embodiment of the present invention provides an internal UI to view, request, and approve limits, as well as an API to view request and approve limits.

In order to submit or approve a limit request, a user may request access to a consolidated limits repository of an embodiment of the present invention. This may occur via an entitlement request system. For example, a user may request a role (e.g., viewer, operator, approver, or manager, etc.) for a line of business (e.g., Equities, Foreign Exchange), or a function (e.g., Credit Risk Executive, E-Trading Market Risk, Business Control Officer, etc.). Each line of business and function may have an Information Owner who may approve the IBID request. In addition, as part of the limit type definition, the system of an embodiment of the present invention may capture which roles, lines of business, and functions may view, request, or approve each limit. The system may then compare this information to the user's entitlements to enforce the appropriate permissions.

The consolidated limits repository of an embodiment of the present invention may support multiple levels of approvals. According to an exemplary application, the system may be programmed to not distribute the limit to an enforcement system until all (or a predetermined group of) approvals are received. For example, each limit type may be customized with a corresponding approval workflow.

A consolidated limits repository may support dynamic creation of new limit types via an interactive user interface, such as an administration screen. In this example, the system may require that the new limit type conforms to an existing limit structure.

According to an embodiment of the present invention, a portfolio may represent a construct which allows for customized groupings of data. Portfolios may be used to allow credit users (or other users) to slice and dice data.

Figure 3:
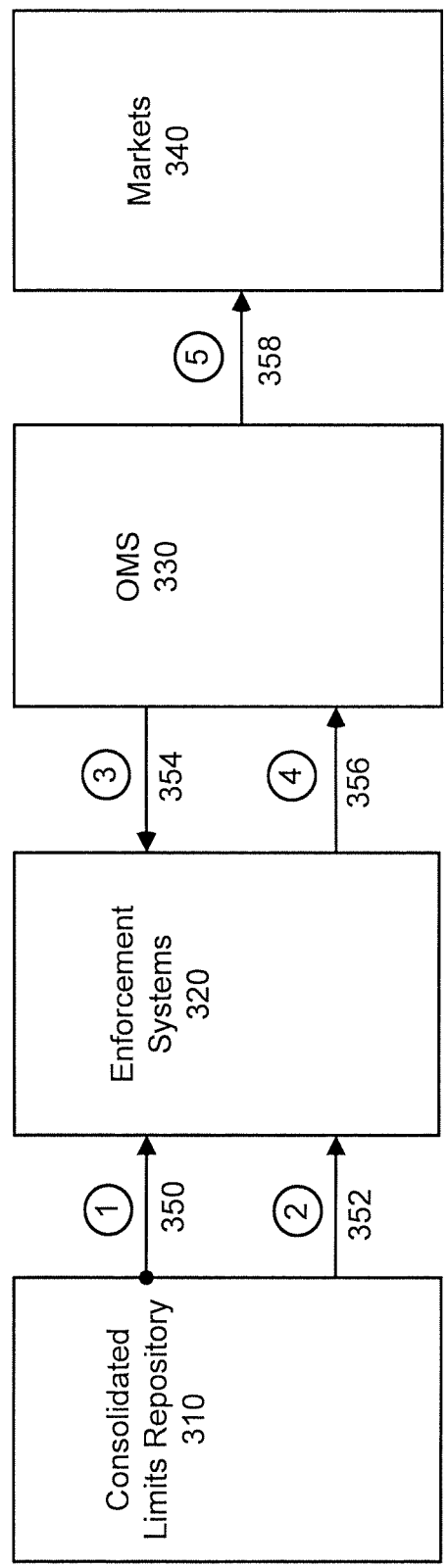
FIG. 3 is a system flow of an exemplary enforcement system, according to an embodiment of the present invention.

FIG. 3 is a system flow of an exemplary enforcement system, according to an embodiment of the present invention. For example, at a start of a day (or other time period), Enforcements Systems 320 may retrieve limits from a Consolidated Limits Repository 310, as represented by flow 350 As limits change during a day (or other time period), real-time updates may be published to Enforcement Systems 320 after changes have been approved, as represented by flow 352. For example, when an order is submitted from an Order Management System (OMS), the OMS may check with an enforcement platform, to ensure the trader is within their limit, as represented by flow 354. Enforcement Systems 320 may respond indicating whether the order is allowed to proceed and if any warning thresholds have been breach, as represented by flow 356. If the system determines that there are no issues, the order may be routed to Markets 340, as represented by flow 358. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
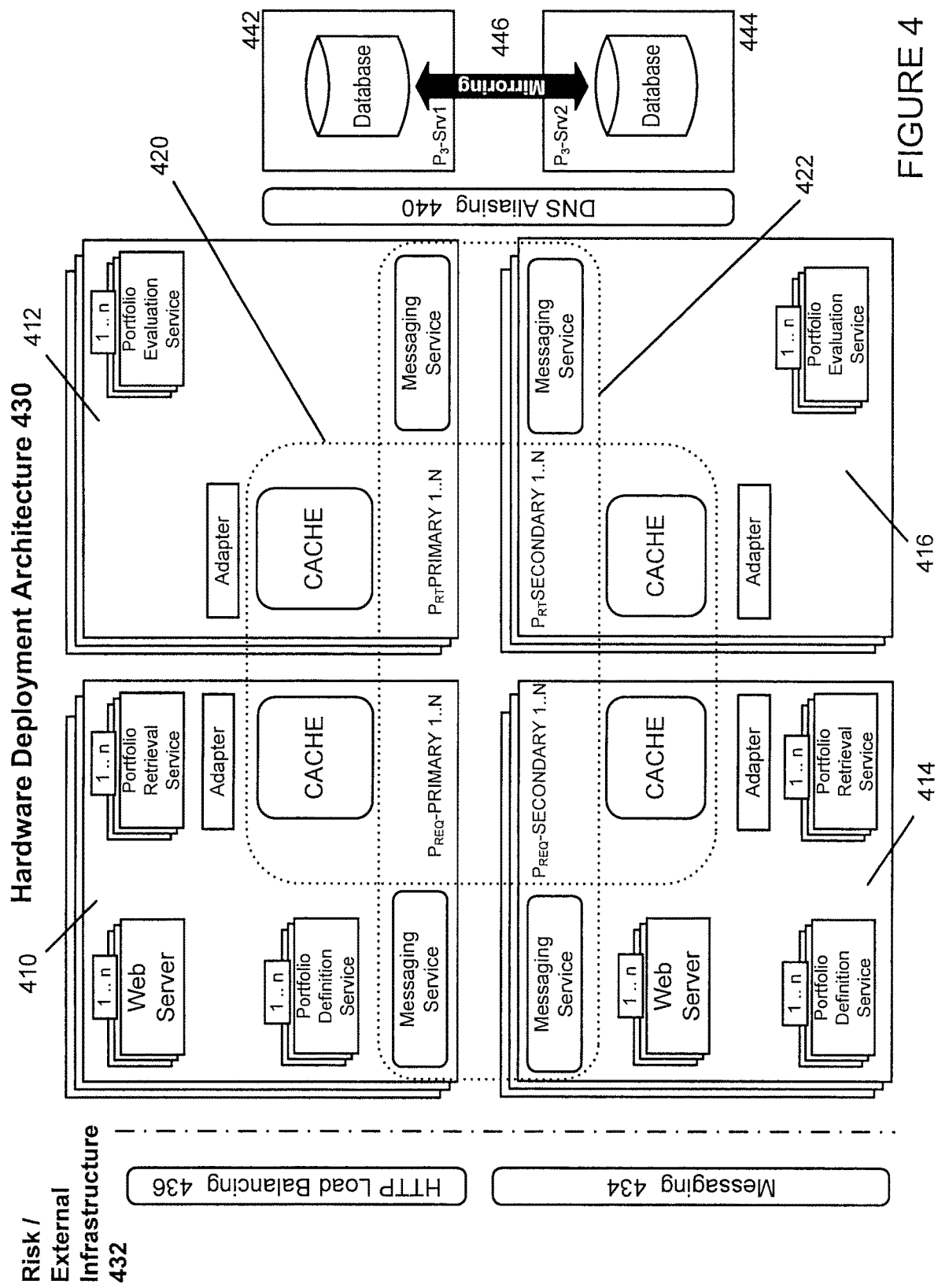
FIG. 4 is a diagram of a system architecture, according to an embodiment of the present invention.

FIG. 4 is a diagram of a system architecture, according to an embodiment of the present invention. FIG. 4 illustrates an exemplary embodiment that may be updated and modified depending on various applications. System 430 represents a hardware deployment architecture. In this exemplary illustration, System 430 may support multiple clusters represented as 410, 412, 414 and 416. Cluster 410 may support WebServer, Portfolio Retrieval Service, Adapter, Portfolio Definition Service, Cache and Messaging Service. Cluster 412 may support Portfolio Evaluation Service, Adapter, Cache and Messaging Service. Cluster 414 may include Web Server, Portfolio Definition Service, Portfolio Retrieval Service, Adapter, Cache and Messaging Service. Cluster 416 may support Portfolio Evaluation Service, Adapter, Cache and Messaging Service. System 430 may support a Distributed Cache architecture, as illustrated by 420. System 430 may also support a Messaging architecture, as illustrated by 422. System 430 may communicate with Risk/External Infrastructure represented as 432, with Messaging Interface 434 and Load Balancing 436. System 430 may also interface with one or more Databases, represented by 442, 444. Database 442 may represent a primary database where Database 444 may represent a secondary database where mirroring functionality may be performed as shown by 446.

Figure 5:
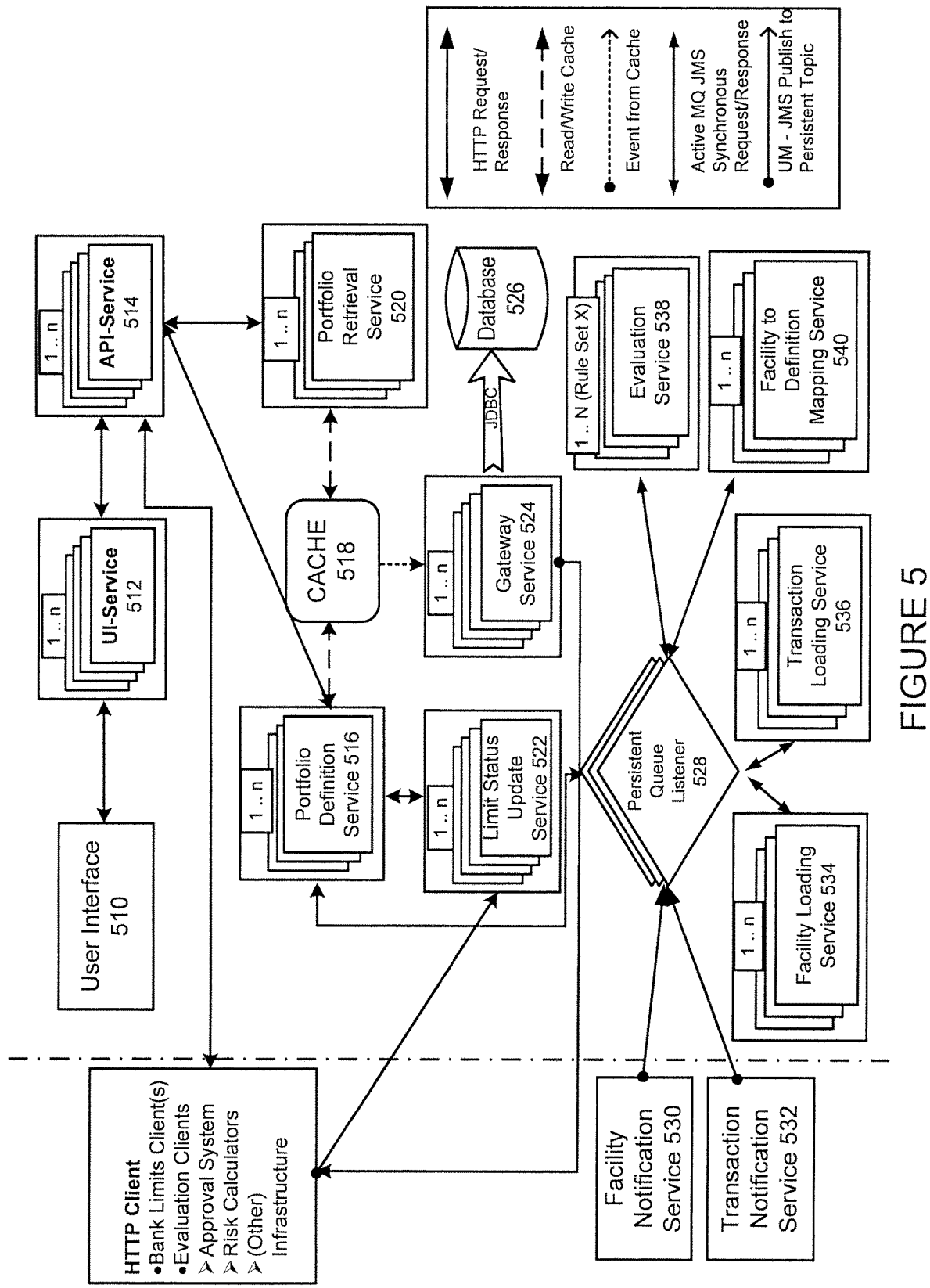
FIG. 5 is an exemplary process architecture, according to an embodiment of the present invention.

FIG. 5 is an exemplary process architecture, according to an embodiment of the present invention. FIG. 5 illustrates an exemplary embodiment that may be updated and modified depending on various applications. User Interface 510 may invoke various UI Services, represented by 512, and API Services, represented by 514. API Service 514 may communicate with HTTP Clients, which may include bank limits clients, evaluation clients (e.g., approval system, risk calculators, and other infrastructure, etc.). The exemplary process architecture of FIG. 5 may further include a Portfolio Definition Service 516, Cache 518 and Portfolio Retrieval Service 520. For example, Portfolio Definition Service 516 may persist data while Portfolio Retrieval Service 520 retrieves data. Cache 518 may provide events to Gateway Service 524, which then communicates with Database 526. Gateway Service 524 further communicates with HTTP Client and Limit Status Update Service 522. Limit Status Update Service 522 may process acknowledgements from downstream systems to indicate they have successfully processed updates. Gateway Service 524 may represent a WAN gateway to orchestrate cache data management, system event management and external systems communications. Persistent Queue Listener 528 may interact with Facility Notification Service 530 and Transaction Notification Service 532, which may be maintained outside of the consolidated limits repository architecture. Persistent Queue Listener 528 may also interact with Facilitating Loading Service 532, Transaction Loading Service 536, Facility to Definition Mapping Service 540 and Evaluation Service 538. For example, Evaluation Service 538 may be optional and removed from the system.

An embodiment of the present invention is directed to a strategic limits management application which provides the ability to view, request, and approve Credit Risk, Market Risk, and Front Office limits and key controls for an entity, such as a client. An embodiment of the present invention is directed to a user interface where users may access a Workplace and Dashboard. For example, users may access a Workspace to view and input limits. Limits may be created, modified, and deleted via the workspace, and limit requests may also be cancelled or withdrawn prior to approval. Users may also access a Dashboard to approve limits and display pending and recently actioned limit approval requests.

Figure 6:
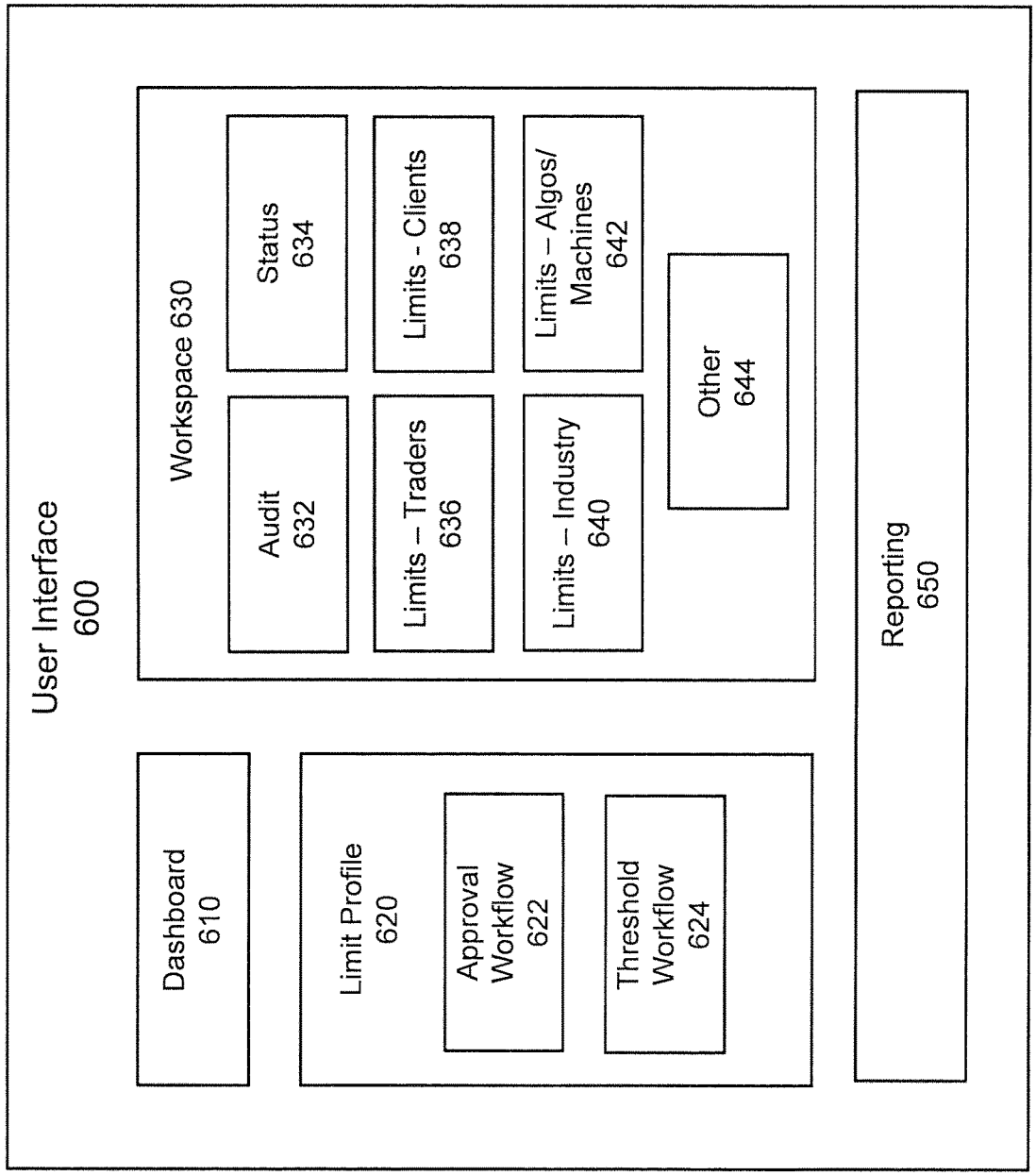
FIG. 6 is an exemplary illustration of a user interface, according to an embodiment of the present invention.

FIG. 6 is an exemplary illustration of a user interface, according to an embodiment of the present invention. User Interface 600 may include various modules and functions, as represented by Dashboard 610, Limit Profile 620 and Workspace 630. User Interface 600 may also include a filter bar which is a row that appears below the column headers in a grid and allows users to enter a filter value for any field (multiple values are also supported). The grid may be also fully customizable (e.g., add/remove columns, sort, etc.) and users may save their own view. It also has an export to Excel functionality. The search criteria section may be dynamic—based on the line of business that is selected, different fields to search are displayed, etc. A user preference section allows users to set defaults. Limits may also be republished to consuming systems via a feature in the UI. A workflow status display may include a plurality of bubbles, which show the current workflow status of a limit. For example, 1 circle checked is submitted, 2 circles checked is approved, and 3 circles checked indicates the limit has been successfully received by the consuming system(s). Other variations may be implemented. An X in the second circle represents a rejection by an approver, and an X in the third circle indicates that the consuming system could not process the update.

According to an exemplary embodiment, Dashboard 610 provides users with the ability to approve and/or reject limits. Dashboard 610 may also provide the ability to enter comments on approval and rejections. For example, Dashboard 610 may include an Approvals section that displays limits that are pending approval for the user. Limits may be actioned by checking the relevant limits and interacting with an "Approve" or "Reject" button. For example, the dashboard may automatically group transactions that were requested at the same time together for ease of approval. Users may still deselect individual rows if they do not want specific limits in the group to be actioned together. A My Requests section may display limits submitted by a user and pending approval. A Recent Activity section may display a list of recently created and approved limit requests. According to another example, Limit requests may be approved by various communication modes. For example, when a limit is requested, an email (or other electronic communication) may be sent to one or more eligible approvers who may then action the request by approving or rejecting directly within the email. This functionality may also be utilized via mobile devices.

According to an exemplary embodiment, Limit Profile 620 may include an Approval Workflow Grid 622 and Threshold Workflow Grid 624. Grid functionality may provide data that may be filtered via a filter bar and/or other mechanism. For example, Columns may be sorted by ascending or descending order. Also, columns may be added and removed by user interaction.

An embodiment of the present invention may implement limit profiles to apply a set of limits to a group of traders, clients and/or other defined set of users. For example, a group of junior equities traders may all have the same limits based on their experience level. An embodiment of the present invention may apply a limit profile to the group of junior equities traders where limits may be set, revised, and/or updated for all traders through the limit profile. This feature provides consistency, flexibility and efficiency.

An embodiment of the present invention may be directed to threshold profiles. In this example, because of volume, the system may apply a default set of limits depending on client profile, rating of the client, creditworthiness, authority level and/or other client data, industry metrics, etc. Accordingly, the system may apply an auto approval for certain requests based on the level of risk and/or other factors. The profile functionality also allows users to set up approval grids. For instance, based on the grade of a client and the limit amount being requested, a Credit Executive with a minimum level of authority may be required to approve. These grids may be edited online directly in the system and go through a separate approval workflow process.

According to an exemplary embodiment, Workspace 630 may enable users to view and input limits. Workspace 630 may include Audit 632, Workflow Status 634, Limits on Traders 636, Limits on Clients 638, Limits on Industry 640 and Limits on Algos/Machines 642. Other functionality may be provided by User Interface 600, as represented by Other 644. For example, users may view limits as well as create and update limits. Users may also create temporary limits. Depending on the line of business, temporary limits may be enabled which allows for overrides to original limits for specified time periods. From and to dates may be specified for a limit by the user. The system insulates the consumers from this functionality so to them it just looks like a regular limit update. When a temporary limit comes into effect, the system may publish a regular limit update with a new version, and when the temporary limit expires, another update with a new version may be published.

Reporting functionality may be provided by 650. A user may request various reports in user preferred formats (e.g., tables, illustrations, diagrams, graphs, etc.) based on user input and specifications. For example, a user may request to view all limit changes that occurred for a set of traders over a period of time (e.g., past period, predetermined time frame, user defined range, etc.).

An embodiment of the present invention may be directed to a periodic review. For example, a user may access the system and review current limits as well as affirm and/or update limits as appropriate. The user's review and updates may then be automatically updated to the consolidated limits repository. Another feature of an embodiment of the present invention is directed to a self-service audit reporting functionality, which allows users to retrieve changes over a specified period of time.

While the exemplary embodiments described herein may show the various embodiments of the invention (or portions thereof) collocated, it is to be appreciated that the various components of the various embodiments may be located at distant portions of a distributed network, such as a local area network, a wide area network, a telecommunications network, an intranet and/or the Internet, or within a dedicated object handling system. Thus, it should be appreciated that the components of the various embodiments may be combined into one or more devices or collocated on a particular node of a distributed network, such as a telecommunications network, for example. As will be appreciated from the following description, and for reasons of computational efficiency, the components of the various embodiments may be arranged at any location within a distributed network without affecting the operation of the respective system.

Data and information maintained by a Processor may be stored and cataloged in a Database which may comprise or interface with a searchable database. The database may comprise, include or interface to a relational database. Other databases, such as a query format database, a Standard Query Language (SQL) format database, a storage area network (SAN), or another similar data storage device, query format, platform or resource may be used. The database may comprise a single database or a collection of databases, dedicated or otherwise. In one embodiment, the database may store or cooperate with other databases to store the various data and information described herein. In some embodiments, the database may comprise a file management system, program or application for storing and maintaining data and information used or generated by the various features and functions of the systems and methods described herein. In some embodiments, the database may store, maintain and permit access to participant information, transaction information, account information, and general information used to process transactions as described herein. In some embodiments, the database is connected directly to the Processor, which, in some embodiments, it is accessible through a network, such as a communication network, for example.

Communications network may be comprised of, or may interface to any one or more of, the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, or a Copper Distributed Data Interface (CDDI) connection.

Communications network may also comprise, include or interface to any one or more of a Wireless Application Protocol (WAP) link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 107 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network may comprise a satellite communications network, such as a direct broadcast communication system (DBS) having the requisite number of dishes, satellites and transmitter/receiver boxes, for example. Communications network may also comprise a telephone communications network, such as the Public Switched Telephone Network (PSTN). In another embodiment, communication network may comprise a Personal Branch Exchange (PBX), which may further connect to the PSTN.

In some embodiments, the processor may include any terminal (e.g., a typical home or personal computer system, telephone, personal digital assistant (PDA) or other like device) whereby a user may interact with a network, such as communications network, for example, that is responsible for transmitting and delivering data and information used by the various systems and methods described herein. The processor may include, for instance, a personal or laptop computer, a telephone, or PDA. The processor may include a microprocessor, a microcontroller or other general or special purpose device operating under programmed control. The processor may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. The processor may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). The processor may also include a network-enabled appliance, a browser-equipped or other network-enabled cellular telephone, or another TCP/IP client or other device.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

The invention claimed is:

1. An automated computer implemented system that maintains and manages limits data relating to restrictions associated with a trader entity, wherein the system comprises:

a consolidated repository that stores and manages a plurality of trading limits that define how much the trader entity can trade or clear with an entity, wherein the trading limits are based on client risk limits and house risk limits comprising one or more of credit risk exposure, market risk, front office risk and risks determined by one or more regulations, wherein the consolidated repository implements real-time distributed caching that provides real-time approval of limit change requests, wherein the consolidated repository applies one or more group limit profiles to a group of employees within an entity where the trading limits are set, revised, and/or updated for the group of employees through the one or more group limit profile, wherein the consolidated repository applies a single trading limit to a portfolio of a plurality of entities including a trader entity, a client, a machine and a product, and wherein the consolidated repository temporarily and automatically modifies the applied trading limits in response to a detection of a target event;

an interactive user interface that receives one or more user inputs;

a trading system interface that communicates approved limits and alert thresholds to one or more trading or limit enforcement systems; and a computer processor, coupled to the consolidated repository, the interactive user interface and the trading system interface, and programmed to:

receive one or more trading limits from a plurality of sources, the one or more trading limits comprising client risk limits and house risk limits;

receive a request to apply at least one of the one or more trading limits to a client account;

verify that the request to apply at least one of the one or more trading limits was received from an authorized requestor;

achieve standardization and interoperability across all limits enforcement systems by capturing the one or more trading limits in a JSON-formatted configuration file wherein the JSON-formatted configuration file also includes a set of criteria that uniquely defines each of the one or more trading limits and its attributes, including upper and lower bounds, and an identification of one or more entities to which the one or more trading limits apply;

identify, for each requested trading limit, one or more authorized users to approve the one or more trading limits;

distribute the one or more trading limits to the one or more authorized users for approval;

receive, from the authorized user, real-time approval of the request to apply at least one of the one or more trading limits;

disseminate for enforcement, via RESTful web service mechanisms for network-based computer system interoperability, the approved one or more trading limits;

provide notification to the trader entity of the approved one or more trading limits;

effectuate the one or more approved trading limits for a trade request associated with the client account via one or more trading or limit enforcement systems;

send one or more alert thresholds, relating to the plurality of trading limits, for the trade request to one or more of a requester and the one or more trading or limit enforcement systems; and provide, via the interactive user interface, a comprehensive consolidated view of limits across the entity as wells as an audit trail that identifies the requested trading limits for a client account, the authorized requestor, the authorized approver, and one or more details concerning an associated limit, wherein the audit trail provides historical risk limits data over a user-defined period of time.

2. The system of claim 1, wherein the interactive user interface provides a consolidated view of limits across an entity.

3. The system of claim 1, wherein a trader profile is applied to a group of traders so that limits data is set to apply to each trader of the group of traders.

4. The system of claim 1, further comprising an entitlement framework that ensures consistent and accurate enforcement of limits.

5. The system of claim 1, further comprising a messaging function that distributes a warning threshold.

6. The system of claim 1, wherein the entity comprises a trader, a client, a machine, legal entity, industry, line of business, instance, exchange, or product.

7. The system of claim 1, wherein the computer processor is further programmed to:

responsive to the inputs, generate exposure metrics and risks for a trade request; and identify one or more limits for the trade request based on the exposure metrics and risks.

8. An automated computer implemented method for maintaining and managing limits data relating to restrictions associated with a trader entity, wherein the method comprises the steps of:

receiving one or more trading limits from a plurality of sources, the one or more trading limits comprising client risk limits and house risk limits;

maintaining the inputs in a consolidated repository that stores and manages a plurality of trading limits that define how much the trader entity can trade or clear with an entity, wherein the trading limits are based on client risk limits and house risk limits comprising one or more of: credit risk exposure, market risk, front office risk and risks determined by one or more regulations, wherein the consolidated repository implements real-time distributed caching that provides real-time approval of limit change requests, wherein the consolidated repository applies one or more group limit profiles to a group of employees within an entity where the trading limits are set, revised, and/or updated for the group of employees through the one or more group limit profile, wherein the consolidated repository applies a single trading limit to a portfolio of a plurality of entities including a trader entity, a client, a machine and a product, and wherein the consolidated repository temporarily and automatically modifies the applied trading limits in response to a detection of a target event;

receiving a request to apply at least one of the one or more trading limits to a client account;

verifying that the request to apply at least one of the one or more trading limits was received from an authorized requestor;

achieving standardization and interoperability across all limits enforcement systems by capturing the one or more trading limits in a JSON-formatted configuration file wherein the JSON-formatted configuration file also includes a set of criteria that uniquely defines each of the one or more trading limits and its attributes, including upper and lower bounds, and an identification of one or more entities to which the one or more trading limits apply;

identifying, for each requested trading limit, one or more authorized users to approve the one or more trading limits;

distributing the one or more trading limits to the one or more authorized users for approval;

receiving, from the authorized user, real-time approval of the request to apply at least one of the one or more trading limits;

disseminating for enforcement, via RESTful web service mechanisms for network-based computer system interoperability, the approved one or more trading limits;

providing notification to the trader entity of the approved one or more trading limits;

effectuating, via a trading system interface that communicates approved limits and alert thresholds to one or more trading or limit enforcement systems, the one or more approved trading limits for a trade request associated with the client account via one or more trading systems;

sending one or more alert thresholds, relating to the plurality of trading limits, for the trade request to one or more of a requester and the one or more trading or limit enforcement systems; and providing, via an interactive user interface that receives one or more user inputs, a comprehensive consolidated view of limits across the entity as wells as an audit trail that identifies the requested trading limits for a client account, the authorized requestor, the authorized approver, and one or more details concerning an associated limit, wherein the audit trail provides historical risk limits data over a user-defined period of time.

9. The method of claim 1, wherein the interactive user interface provides a consolidated view of limits across an entity.

10. The method of claim 1, wherein a trader profile is applied to a group of traders so that limits data is set to apply to each trader of the group of traders.

11. The method of claim 1, further comprising an entitlement framework that ensures consistent and accurate enforcement of limits.

12. The method of claim 1, further comprising real-time distributed caching that provides real-time approval of limit change requests.

13. The method of claim 1, further comprising a messaging function that distributes a warning threshold.

14. The method of claim 1, wherein the entity comprises a trader, a client or a machine.

* * * * *